United States Patent
Li

(10) Patent No.: US 8,301,161 B2
(45) Date of Patent: Oct. 30, 2012

(54) METHOD, DEVICE, AND SYSTEM FOR OBTAINING A MOBILE COMPUTING DEVICE LOCATION

(75) Inventor: Xintian Li, Cupertino, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 76 days.

(21) Appl. No.: 12/913,609

(22) Filed: Oct. 27, 2010

(65) Prior Publication Data

US 2012/0108258 A1    May 3, 2012

(51) Int. Cl.
  G06F 15/16   (2006.01)
  H04J 3/00   (2006.01)
(52) U.S. Cl. .............. 455/456.1; 709/206; 370/345
(58) Field of Classification Search ........... 455/456.1; 370/345; 709/206
  See application file for complete search history.

(56) References Cited

U.S. PATENT DOCUMENTS

| | | | | |
|---|---|---|---|---|
| 7,953,392 | B2* | 5/2011 | Karstens | 455/411 |
| 2008/0089313 | A1* | 4/2008 | Cayo et al. | 370/345 |
| 2009/0219785 | A1* | 9/2009 | Van ''T Klooster et al. | 367/124 |
| 2011/0161427 | A1* | 6/2011 | Fortin et al. | 709/206 |

OTHER PUBLICATIONS

Wikipedia Contributors, "Animal echolocation", "http://en.wikipedia.org/wiki/Animal_echolocation", Jul. 14, 2011, Page last revised Apr. 12, 2011, p. 12 Publisher: Wikipedia, The Free Encyclopedia, Published in: US.
End Run Technologies, "Webpage, Network Time Servers", Jul. 14, 2011, p. 3, 2005-2011, Published in: US.
Wikipedia Contributors, "Speed of Sound", "http://en.wikipedia.org/wiki/Speed_of_sound", Jul. 14, 2011, Page last revised Jul. 8, 2011, p. 16, Publisher: Wikipedia, The Free Encyclopedia, Published in: US.

* cited by examiner

*Primary Examiner* — Kent Chang
*Assistant Examiner* — Ngan Pham Li
(74) *Attorney, Agent, or Firm* — Neugeboren O'Dowd PC

(57) ABSTRACT

One embodiment of the present invention comprises a method of determining a mobile computing device location. The method may comprise emitting at least one audio signal from at least one audio signal emitter and determining a sending time of the at least one audio signal. The method further comprises receiving the at least one audio signal at the mobile computing device and determining a receiving time of the at least one audio signal. A difference between the receiving time and the sending time is calculated and this difference is used to determine a distance from the at least one audio signal emitter to the mobile computing device. The distance is then used to obtain a location of the mobile computing device.

22 Claims, 4 Drawing Sheets

METHOD, DEVICE, AND SYSTEM FOR OBTAINING A MOBILE COMPUTING DEVICE LOCATION

FIELD OF THE INVENTION

The present invention relates to mobile computing devices. In particular, but not by way of limitation, the present invention relates to methods, devices and systems for obtaining a precise location of a mobile computing device.

BACKGROUND OF THE INVENTION

Many current systems adapted to determine the location of a mobile computing device may only provide a general device location. For example, a location of a mobile computing device adapted to receive global positioning system (GPS) signals may only be determined to within 2-3 meters of the actual device location. Similarly, the location of a mobile computing device enabled to communicate through a WiFi connection may also only be determined to within 2-3 meters of the actual device location.

If a location of a mobile computing device could be determined to within a millimeter or even a centimeter of the actual device location, such a highly-precise location would enable service providers to offer additional location-based services.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention may be characterized as a method of determining a mobile computing device location. One method in this embodiment comprises emitting at least one audio signal from at least one audio signal emitter. The method further comprises determining a sending time of the at least one audio signal, with the sending time comprising a time that the at least one audio signal was emitted from the at least one audio signal emitter. Furthermore, the method comprises receiving the audio signal at the mobile computing device and determining a receiving time of the at least one audio signal, with the receiving time comprising a time that the at least one audio signal was received at the mobile computing device. Finally, one method comprises calculating a difference between the receiving time and the sending time, and using the difference between the receiving time and the sending time to determine a distance from the at least one audio signal emitter to the mobile computing device.

Another embodiment of the invention may be characterized as a device location determination system comprising at least one audio signal emitter, a mobile computing device, and a server. One mobile computing device is adapted to receive an audio signal emitted from the at least one audio signal emitter. One server is server in communication with the at least one audio signal emitter and the mobile computing device. Furthermore, at least one of the at least one audio signal emitter, mobile computing device, and server is adapted to use an audio signal sending timestamp and an audio signal receiving timestamp to determine the distance between the at least one audio signal emitter and the mobile computing device.

Yet another embodiment of the invention may be characterized as a non-transitory, tangible computer-readable storage medium, encoded with processor-readable instructions to perform a method of obtaining a location of a mobile computing device. The method includes determining a first difference between a sending time comprising the time that a first audio signal is emitted from a first audio signal emitter, and a receiving time comprising the time that the first audio signal is received by the mobile computing device. The method further includes determining a second difference between a sending time that a second audio signal is emitted from a second audio signal emitter and a receiving time that the second audio signal is received by the mobile computing device. Additionally, a third difference between a sending time that a third audio signal is emitted from a third audio signal emitter device and a receiving time that the third audio signal is received by the mobile computing device is determined. The first difference, second difference, and third difference are then used to obtain the location of the mobile computing device.

And another embodiment of the invention may be characterized as a mobile computing device that includes a microphone, memory components, a wireless receiver, and processing components. The microphone is adapted to receive at least one audio signal from one or more audio signal emitters. The memory components are adapted to record a receiving time that the at least one audio signal was received at the mobile computing device. The wireless receiver is adapted to receive a sending time for the one or more audio signals. The processing components are adapted to calculate a difference between the receiving time and the sending time and are further adapted to use a temperature reading output from a temperature sensor to determine a distance from the at least one audio signal emitter to the mobile computing device.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
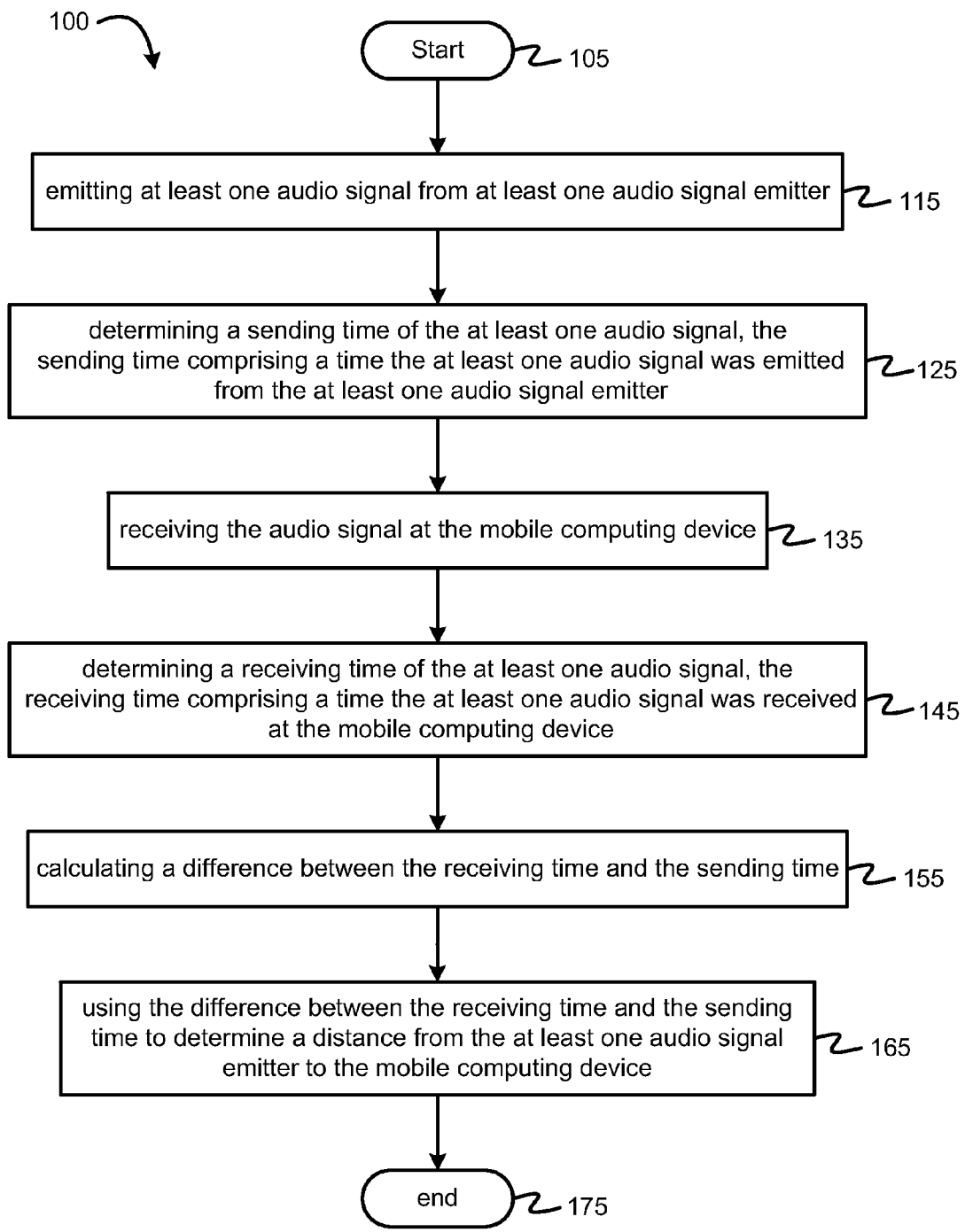
FIG. 1 is a flowchart that depicts a method that may be carried out in connection with the embodiments described herein.
Figure 2:
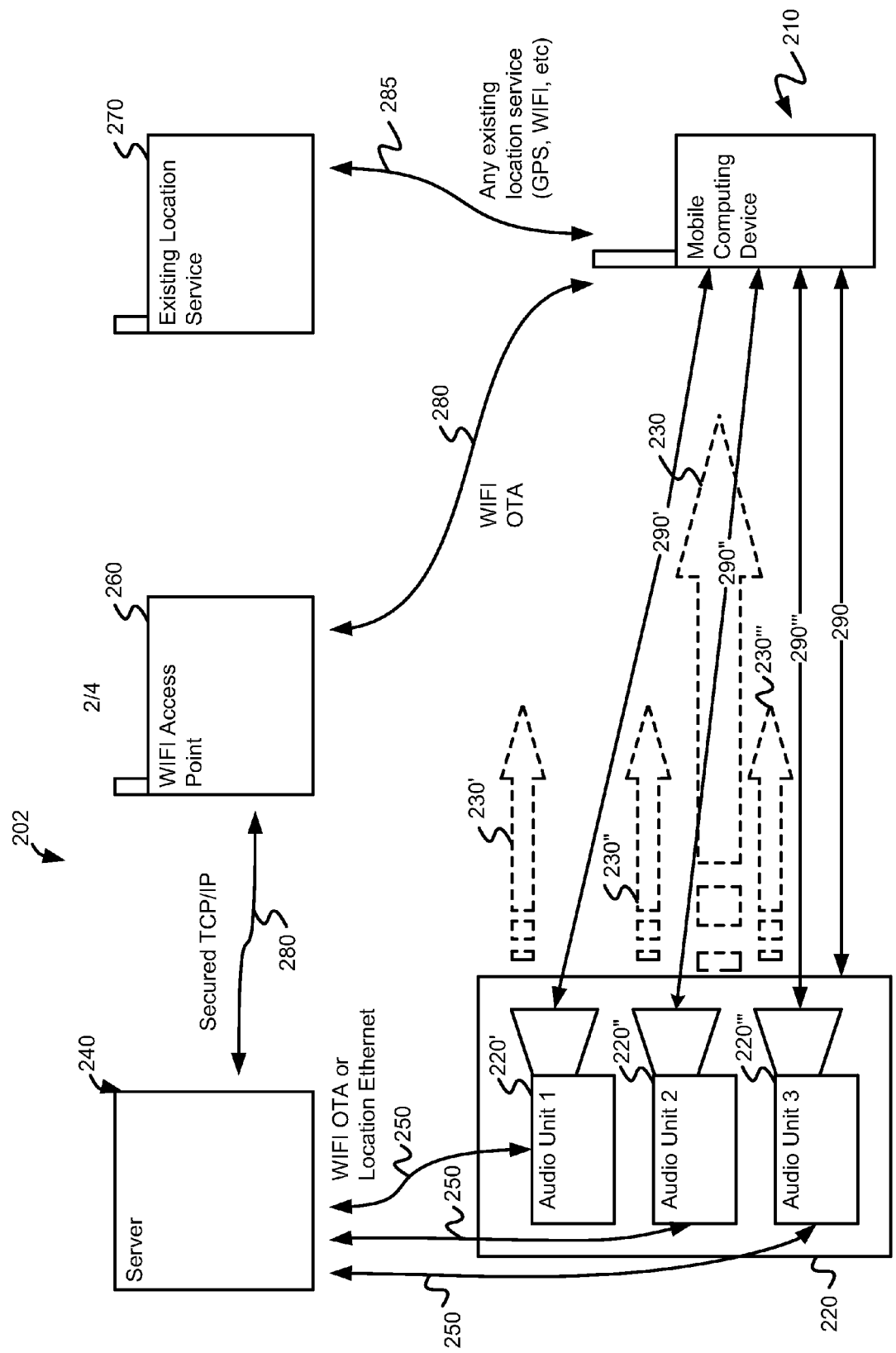
FIG. 2 illustrates a block diagram depicting one exemplary embodiment of the present invention.

Referring first to FIG. 1, shown is a method 100 of determining a mobile computing device location. The method 100 starts at 105 and at 115 comprises emitting at least one audio signal from at least one audio signal emitter. For example, seen in FIG. 2 is a first audio signal emitter 220' adapted to emit a first audio signal 230', a second audio signal emitter 220" adapted to emit a second audio signal 230", and a third audio signal emitter 220''' adapted to emit a third audio signal 230'''. Throughout the application the terms audio signal emitter(s) 220 and at least one audio signal emitter 220 may be used in place of the terms first audio signal emitter 220', second audio signal emitter 220'', and/or third audio signal emitter 220'''. Furthermore, the audio signal emitter 220 may also comprise a signal emitting device. Additionally, the terms audio signal(s) 230 and/or at least one audio signal 230 may be used in place of the terms first audio signal 230', second audio signal 230'' and/or third audio signal 230'''. Furthermore, the audio signals 230 may comprise and be referred to as signals. In one embodiment, each of the audio signal emitters 220 may emit an audio signal 230 upon receiving a communication 250 from a server 240 to emit the signal 230. In one embodiment, the communication 250 may comprise an IP request to emit the audio signal 230.

At 125, the method 100 comprises determining a sending time of the at least one audio signal 230, with the sending time comprising a time that the at least one audio signal 230 was emitted from the at least one audio signal emitter 220. The sending time may also be referred to in the application as a sending timestamp. In one embodiment, each audio signal emitter 220 may be adapted to create a digital file comprising the sending time, and the sending time may be received from an internal clock on the audio signal emitter 220. One internal clock of an audio signal emitter may be set through a communication 250 received from the server 240. The digital file comprising the sending time may then be sent to the server 240 in a communication 250 from the audio signal emitter 220.

At 135, the method comprises receiving the at least one audio signal 230 at a mobile computing device 210. For example, the audio signal emitters 220 may comprise one or more speakers and the at least one audio signal 230 may comprise an audible sound wave emitted from the speaker. It is also contemplated that one or more of the audio signals 230 may comprise an ultrasonic sound wave. Other types of signals may also comprise the audio signal. When the audio signal 230 comprises an audible sound wave, the mobile computing device 210 may comprise a microphone or other device adapted to receive the audio signal 230. The mobile computing device 210 may also comprise other devices adapted to receive the audio signal 230.

Upon receiving the at least one audio signal 230 at the mobile computing device 210, at 145 the method 100 comprises determining a receiving time that the at least one audio signal 230 was received at the mobile computing device 210. The receiving time may also be referred to throughout the application as a receiving timestamp. In one embodiment, the mobile computing device 210 is adapted to save the audible signal 230 to a digital file on the mobile computing device 210. In such an embodiment, when the mobile computing device 210 microphone receives the audio signal 230, the audio signal 230 may be recorded to the digital file. The digital file may also comprise a time associated with when the audio signal 230 was received at the mobile computing device 210. The time associated with when the audio signal 230 received at the mobile computing device 210 may comprise the receiving time. The digital file may record the receiving time in the digital file, based on an internal clock in the mobile computing device 210. The internal clock of the mobile computing device 210 may be set to a specific time through the server 240 operatively sending an IP communication 280 to the mobile computing device 210, potentially through a network device 260 such as, but not limited to, a WiFi Access Point as seen in FIG. 2. In one embodiment, the network device 260 is adapted to transfer communications 280 between the server 240 and the mobile computing device 210. The mobile computing device 210 internal clock may be set and correlated to the audio signal emitter 220 through other methods as well.

At 155, the method 100 comprises calculating a difference between the receiving time and the sending time. In one method 100, the server 240 may provide the digital file comprising the sending time received from the at least one audio signal emitter 220 to the mobile computing device 210 through the IP communication 280. In other methods 100, the mobile computing device 210 may send the digital file comprising the receiving time to the server 240 for the server 240 to calculate the difference. The network device 260 or other device may also receive the digital files and determine the difference. In one embodiment, upon receiving the digital file comprising the sending time, the mobile computing device 210 determines the difference in time between the sending time and the receiving time. Using this difference between the receiving time and the sending time, at 165 of the method 100 see in FIG. 1, a distance 290 from the at least one audio signal emitter 220 to the mobile computing device 210 may be determined. For example, the mobile computing device 210 may calculate the difference between the sending time and the receiving time as 15 ms. The mobile computing device may determine that the at least one audio signal 230 traveled at a speed of 330 m/s between the at least one audio emitter 220 and the mobile computing device 210 and therefore, the distance 290 is 4.95 m. By determining the distance 290 that the mobile computing device is from multiple audio emitters 220, a location of the mobile computing device 210 may be determined, assuming the location of the audio emitters 220 is known. One method 100 ends at 175.

One method 100 may comprise additional steps not seen in FIG. 1. For example, at least one air temperature reading may be used to determine the distance 290 between the at least one audio signal emitter 220 and the mobile computing device 210. The mobile computing device 210 and/or the at least one audio signal emitter 220 may comprise a temperature sensor. In one embodiment a reading from a temperature sensor on the at least one audio signal emitter 220 may be included in the communication 250 sent to the server 240 that includes the timestamp. Similarly, a reading from the temperature sensor on the mobile computing device 210 may be sent to the sever 240 in the same communication 280 as the receiving time. In one embodiment, the at least one air temperature reading may be used to determine the speed that the audio signal 230 traveled from the at least one audio emitter 220 to the mobile computing device 210. For example, a sound wave may travel at 349 m/s at 30° C., while a sound wave may only travel at 334.3 m/s at 5° C.

One method 100 may also comprise adjusting the sending time and/or the receiving time. For example, data adapted to calibrate the sending time may be stored on the server 440. The calibration data may adjust the sending time to an appropriate sending time for the devices and network implemented in the method 100. Similarly, data adapted to calibrate the receiving time may be stored on the server 240. The calibration data may adjust the receiving time to an appropriate receiving time for the devices and network implemented. Calibration data may also be stored at other locations besides the server 240.

One method 100 may comprise yet further additional steps. For example, before emitting at least one audio signal 230 from at least one audio signal emitter 220, communication 285 may occur between the mobile computing device 210 and a location service provider 270. For example, the mobile computing device may communicate with an existing location service provider 270 via communication 285 such as, but not limited to, a GPS system. In one embodiment the existing location service provider 270 may comprise the network device 260. The GPS system or other location service provider 270 may provide the mobile computing device 210 with a first mobile computing device location. For example, the GPS system may provide a general co-ordinate value of the location of the mobile computing device 210. This general location may be saved to a digital file.

The method 100 may also comprise sending to the server 240 IP communication 280 comprising the first location of the mobile computing device 210 received from the location service provider 270. In one method the IP communication 280 may also comprise a request to use a location service. The server 240 may receive the request and, based on the first location of the mobile computing device, determine whether the location service is available for the mobile computing device 210.

Turning now to FIG. 2, seen is one device location determination system 202. The device location determination system comprises the at least one audio signal emitter 220, the mobile computing device 210, and the server 240. It is contemplated that in one embodiment, the at least one audio signal emitter 220 and the server 240 may comprise a single device. The device location determination system 202 may also comprise the location service provider 270. One existing location service provider 270 may comprise a WiFi device adapted to provide a WiFi signal to the mobile computing device 210 or a cellular device adapted to provide a cellular signal to the mobile computing device 210. The network device 260, server 240, and audio emitter 220 may comprise a single device.

Figure 4:
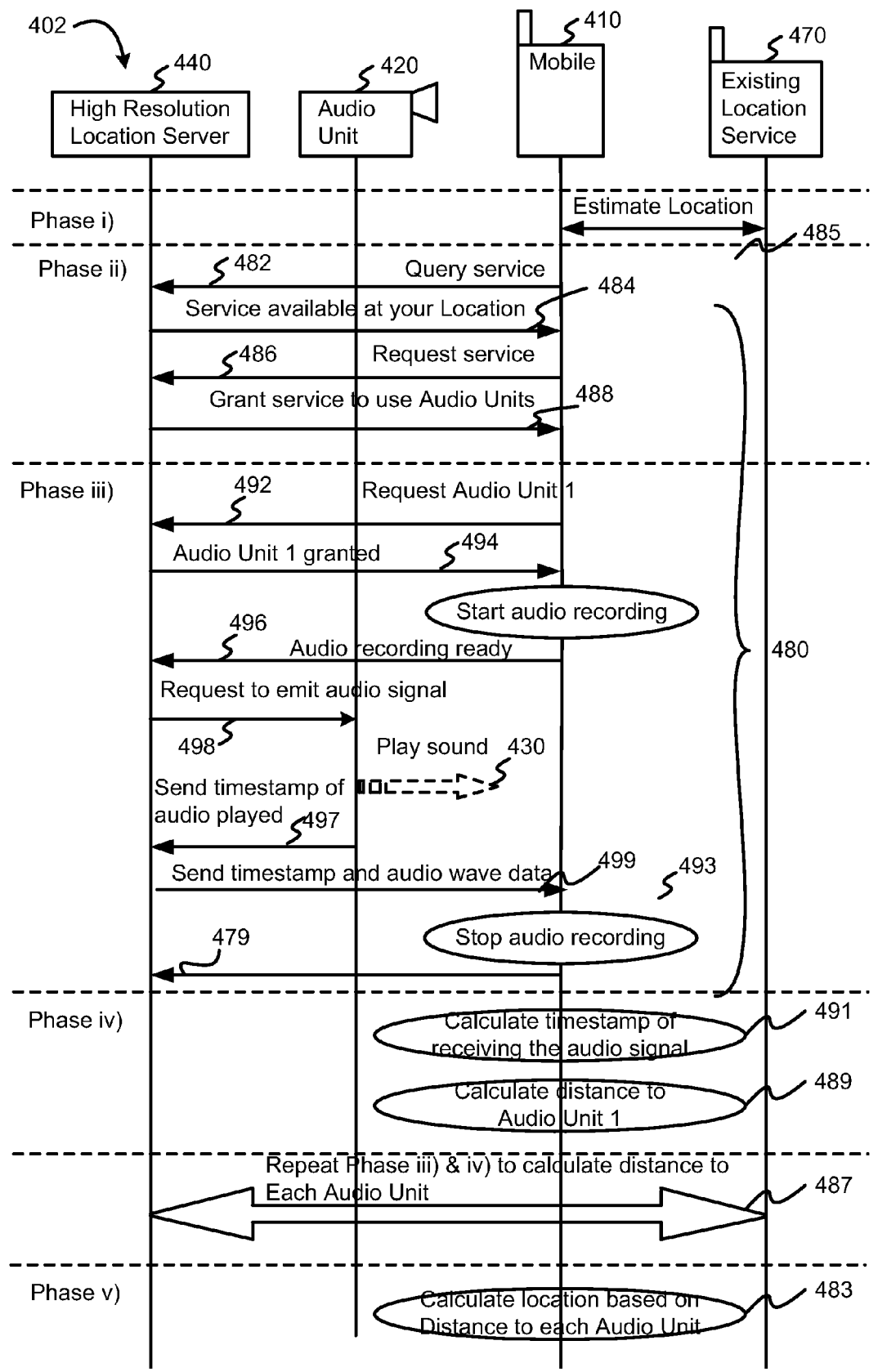
FIG. 4 illustrates a block diagram depicting communications of an exemplary embodiment of the present invention.

FIG. 4 shows various communications adapted to be performed by one device location determination system 402. For example, seen at 485 is the communication 485 between the mobile computing device 410 and the existing location service provider 470 to obtain the first mobile computing device 410 location. Seen at 480 is the communication 480 comprising the request to provide a location service to the mobile computing device 410. As seen, one request to provide a location service may comprise an initial query 482 from the mobile computing device 410 to the server 440, with the server 440 determining whether a location service is available for the mobile computing device at the first mobile computing device 410 location. The server 440 then responds 484 to the mobile computing device 410 and informs the mobile computing device 410 whether the location service is available. If the service is available, the mobile computing device 210 may request 486 to obtain a precise location of the mobile computing device 410. In one embodiment, the resolution of the location of the mobile computing device 410 may be on a centimeter or a millimeter level, so the location of a mobile computing device 410 may be determined to within a millimeter of the actual device location. Upon receiving the request 486 for the server 440 to provide the mobile computing device 410 with a high-resolution location, the server 440 replies 488 to the mobile computing device 410, granting the service request and providing the mobile computing device 410 with a number audio signal emitter 420 units that are available and a location of each audio signal emitter 420. The mobile computing device 410 may then request 492 that the server 440 inform the audio emitters 420 to emit the audio signal 430. To do so, the server replies 494 to the mobile computing device 410 to initiate reception of the audio signal 430. For example, the reply 494 may inform the mobile computing device 410 to begin recording from the microphone to a digital file. The mobile computing device 410 may then inform 496 the server 440 that the mobile computing device 410 is ready to receive an audio signal 430, at which point the sever 440 sends a request 498 to the audio signal emitter 420 to emit the audio signal 430.

After the audio emitter 420 emits the audio signal 430, the sending timestamp of the audio signal 430 is sent 497 to the server 440 and the server 440 sends 499 the sending timestamp and other audio signal 430 data to the mobile computing device 410. In receiving the information from the server 440, the mobile computing device stops 493 recording the audio signal 430. The mobile computing device 410 then calculates 491 the receiving timestamp of the audio signal 430 and determines 489 the distance 290 as seen in FIG. 2 between the mobile computing device 410 and the audio signal emitter 420. In alternative embodiments where the server 440 determines the distance 290 between the mobile computing device 410 and the audio signal emitter 420, instead of the server 440 sending 499 the sending timestamp and other audio signal 430 data to the mobile computing device 410, the sever 440 may send 499 a notification to the mobile computing device 410, for the mobile computing device 410 to stop recording. The mobile computing device 410 may then provide 479 the server 440 with the receiving timestamp and other audio recording data. As seen in FIG. 4, at 487, the communications under "phase iii" and "phase iv" of FIG. 4 are repeated for each audio signal emitter 420. And at 483 the mobile computing device location is calculated based on the distance 290 to each audio signal emitter 420.

Figure 3:
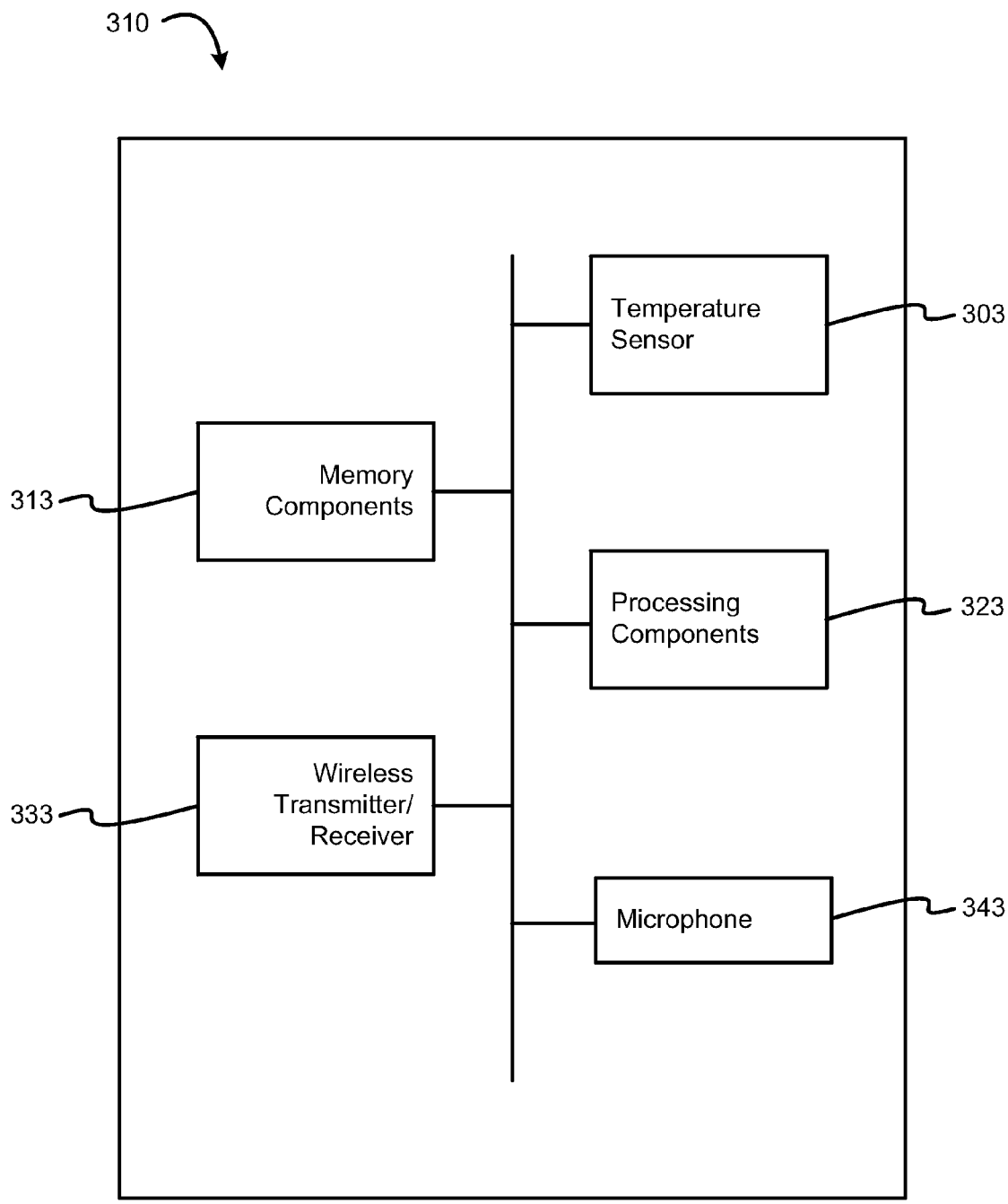
FIG. 3 illustrates a block diagram depicting physical components of an exemplary embodiment of the present invention.

Turning now to FIG. 3, seen is a mobile computing device 310 comprising a temperature sensor 303, a microphone 343, memory components 313, a wireless transmitter/receiver 333, and processing components 323. It is contemplated that the mobile computing device 310 may not include the temperature sensor 303 and that in such an embodiment, the audio signal emitter 220 seen in FIG. 2 may include the temperature sensor. In one embodiment, the memory components 313 are adapted to store one or more digital files comprising the receiving time, the sending time, and one or more temperature readings, among other data. The processing components 323 are adapted to receive the sending time and may receive an audio signal emitter 220 temperature sensor reading from the wireless transmitter/receiver 333. The processing components 323 are further adapted to receive the receiving time and calculate a difference between the receiving time and the sending time. Furthermore, the processing components 323 may use the difference between the receiving time and the sending time, a temperature reading output from the mobile computing device temperature sensor 303, and/or the temperature sensor reading from an audio signal emitter 220, as seen in FIG. 2, to determine (i) the distance 290 from the at least one audio signal emitter 220 to the mobile computing device 210 and (ii) a location of the mobile computing device 310. The memory components 313 are further adapted to store the first mobile device location. The wireless transmitter/receiver 333 is adapted to receive and transmit data between the mobile computing device 310 and the network device 260 and the existing location service provider 270, respectively.

In one embodiment, the memory components 313 and processing components 323 are adapted to operate a non-transitory, tangible computer-readable storage medium, encoded with processor-readable instructions to perform a method of obtaining the location of the mobile computing device 210, as seen in FIG. 2. One method comprises determining a first difference between a sending time that the first audio signal 230' is emitted from a first audio signal emitter 220' and a receiving time that the first audio signal 230' is received by the mobile computing device 210. The method further comprises determining a second difference between a sending time that the second audio signal 230" is emitted from a second audio signal emitter 220" and a receiving time that the second audio signal 230" is received by the mobile computing device 210. Furthermore, the method comprises determining a third difference between a sending time that the third audio signal 230''' is emitted from a third audio signal emitter 220''' and a receiving time that the third audio signal 230''' is received by the mobile computing device 210. The first difference, the second difference, and the third difference are then used to obtain the location of the mobile computing device 210.

For example, a first distance 290' from the first audio signal emitter 220' to the mobile computing device 210 may be obtained by, using a first air temperature reading to determine a first speed for the first audio signal 230'. The first air temperature reading may comprise an average of an air temperature reading taken at the first audio signal emitter 220' and the mobile computing device 210. Once the first air temperature reading is obtained and the speed of the first audio signal 230' is determined, the speed of the first audio signal may be multiplied by the first difference to obtain the first distance 290'. Similarly, a second distance 290" may be obtained by using a second air temperature reading to determine a second speed for the second audio signal 230". The speed for the second audio signal 230" may then be multiplied by the second difference to obtain the second distance 290". Finally, a third distance 290''' may also be obtained by using a third air temperature reading to determine a third speed for the third audio signal 230'''. The speed for the third audio signal 230''' may then be multiplied by the third difference to obtain the third distance 290'''.

In one embodiment, the mobile computing device 210 may be physically moved while receiving the first audio signal 230', second audio signal 230" and third audio signal 230'''. All audio signals 230 may be received at the same time, or they may be received at different times. The audio signals 230 may also comprise different frequencies and/or sounds. The distance and the direction of the movement of the mobile computing device 210 may be obtained upon receiving the first audio signal 230', the second audio signal 230", and third audio signal 230'''. In one embodiment, the device direction and distance may allow a high-resolution location service to provide precise measurements for various applications. It is contemplated that the location of a device other than the mobile computing device 210 may also be obtained. For example, a location of the server 240 may be obtained in a similar manner. Additionally, it is contemplated that one or more the communications 280, 285 may also comprise a Bluetooth® communication 280, 285. Finally, one system 202 may comprise a system integrated to a home entertainment system or a commercial building's audio system.

In conclusion, embodiments of the present invention provide the ability to obtain a highly-precise device location. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising,
   a microphone adapted to receive at least one audio signal from one or more audio signal emitters;
   memory components adapted to store,
      a receiving time that the at least one audio signal was received at the mobile computing device, and
      a temperature reading;
   a wireless receiver adapted to receive a sending time for the one or more audio signals;
   processing components adapted to,
      calculate a difference between the receiving time and the sending time, and
      use the temperature reading and the difference between the receiving time and the sending time to determine a location of the mobile computing device.

2. The mobile computing device of claim 1 wherein,
the temperature reading is output from a mobile computing device temperature sensor;
the wireless receiver is further adapted to receive a communication signal from a service provider; and
the memory components are adapted to store a general location of mobile computing device.

3. The mobile computing device of claim 2 wherein, the wireless receiver is further adapted to receive a response from a server, the response informing the mobile computing device if a mobile computing device location service is available for the general location of the mobile computing device.

4. The mobile computing device of claim 1 wherein, the at least one audio signal comprises one of an ultrasonic and an audible audio signal.

5. The mobile computing device of claim 1 wherein, the processing components are further adapted to determine the location of the mobile computing device to within at least a millimeter of an actual location of the mobile computing device.

6. A method of determining a mobile computing device location comprising,
   emitting at least one audio signal from at least one audio signal emitter;
   determining a sending time of the at least one audio signal, the sending time comprising a time the at least one audio signal was emitted from the at least one audio signal emitter;
   receiving the at least one audio signal at the mobile computing device;
   determining a receiving time of the at least one audio signal, the receiving time comprising a time the at least one audio signal was received at the mobile computing device;
   calculating a difference between the receiving time and the sending time;
   obtaining at least one air temperature reading;
   using the at least one air temperature reading and the difference between the receiving time and the sending time to determine a distance from the at least one audio signal emitter to the mobile computing device; and
   using the distance from the at least one audio signal emitter to obtain a location of the mobile computing device.

7. The method of claim 6 wherein, the at least one audio signal comprises at least one of an ultrasonic signal and an audible signal.

8. The method of claim 6 wherein, the at least one audio emitter comprises a plurality of speakers.

9. The method of claim 6, further comprising,
   obtaining a first mobile computing device location before emitting at least one audio signal from at least one audio signal emitter;
   sending a request from the mobile computing device to a server, wherein the request comprises,
      the first mobile computing device location, and a request to use a location service; and
determining whether the location service is available for the mobile computing device based on the first mobile computing device location.

10. The method of claim 6 wherein, using the difference between the receiving time and the sending time to determine a distance from the at least one audio signal emitter to the mobile computing device comprises,
incorporating at least one air temperature reading; and
calibrating at least one of the sending time and the receiving time.

11. A device-location system comprising,
at least one signal emitting device;
a mobile computing device adapted to
receive a signal comprising a sending signal timestamp emitted from the at least one signal emitting device, and
obtain a receiving timestamp for the signal emitted from the at least one signal emitting device;
a server in communication with the at least one signal emitting device and the mobile computing device; and
wherein,
at least one of the at least one signal emitting device, mobile computing device, and server is adapted to use a the .signal sending timestamp and a the signal receiving timestamp to determine the distance between the at least one signal emitting device and the mobile computing device;
and wherein, the distance from the at least one signal emitting device and the mobile computing device is further determined from, at least one of a signal emitting device temperature reading and a mobile computing device temperature reading.

12. The device-location system of claim 11 wherein,
the signal emitting device comprises at least one speaker adapted to emit an audible signal; and
the mobile computing device comprises a microphone adapted to receive the audible signal.

13. The device-location system of claim 11 further comprising,
a network device adapted to transfer communications between the mobile computing device and the server; and wherein,
the server is adapted to determine a general location of the mobile computing device.

14. The device-location system of claim 13 wherein,
the at least one signal emitting device comprises at least one audio signal emitter adapted to emit at least one audio signal; and
the server is adapted to,
provide timing information to at least one of the audio signal emitter and the mobile computing device,
receive a request to provide a location service to the mobile computing device,
determine whether a location service is available to the mobile computing device, based on the general location of the mobile computing device,
inform the mobile computing device to initiate reception of the at least one audio signal when the location service is available,
inform the at least one audio signal emitter to emit the at least one audio signal when the location service is available, and
receive information comprising an audio signal sending timestamp from the at least one audio signal emitter.

15. The device-location system of claim 11, further comprising a location service provider device adapted to communicate with the mobile computing device through one of a WiFi signal, a GPS signal, and a cellular signal.

16. The device-location system of claim 11 wherein, the distance from the at least one signal emitting device and the mobile computing device is further determined from,
a calibration of at least one of the signal sending timestamp and the receiving timestamp.

17. A non-transitory, tangible computer-readable storage medium, encoded with processor-readable instructions to perform a method of obtaining a location of a mobile computing device, the method comprising,
determining a first difference between a sending timestamp for a first audio signal emitted from a first audio signal emitter and a receiving timestamp for the first audio signal received by the mobile computing device;
determining a second difference between a sending timestamp for a second audio signal is emitted from a second audio signal emitter and a receiving timestamp for the second audio signal-is received by the mobile computing device;
determining a third difference between a sending timestamp for a third audio signal is emitted from a third audio signal emitter and a receiving timestamp for the third audio signal received by the mobile computing device;
determining an air temperature; and
using the air temperature, the first difference, the second difference, and the third difference to obtain the location of the mobile computing device.

18. The non-transitory, tangible computer-readable storage medium of claim 17, wherein, using the first difference, the second difference, and the third difference to obtain the location of the mobile computing device comprises,
obtaining a first distance from the first audio signal emitter to the mobile computing device by,
using a first air temperature reading to determine a first speed of the first audio signal, and
calibrating at least one of the sending time and the receiving time of the first audio signal;
obtaining a second distance from the second audio signal emitter to the mobile computing device by,
using a second air temperature recording to determine a second speed of the second audio signal, and
calibrating at least one of the sending time and the receiving time of the second audio signal;
obtaining a third distance from the third audio signal emitter to the mobile computing device by,
using a third air temperature recording to determine a third speed of the third audio signal, and
calibrating at least one of the sending time and the receiving time of the third audio signal.

19. The non-transitory, tangible computer-readable storage medium of claim 18, wherein, the method further comprises,
moving the mobile computing device while the first audio signal, the second audio signal, and third audio signal are being received by the mobile computing device; and
obtaining a distance and a direction of the mobile computing device movement.

20. The non-transitory, tangible computer-readable storage medium of claim 17, wherein prior to determining a first difference between the sending timestamp for the first audio signal was emitted from the first audio signal emitter and the receiving timestamp for the first audio signal was received by the mobile computing device, the method further comprises,
estimating a first mobile computing device location;
sending the first mobile computing device location to a server;

querying the server for an availability of a location-based service; and sending a request to the server for the server to initiate emitting the first audio signal.

21. The mobile computing device of claim 1, wherein, use the temperature reading and the difference between the receiving time and the sending time to determine a location of the mobile computing device comprises, use the temperature reading to obtain a speed of the at least one audio signal, and use the speed of the at least one audio signal and the difference between the receiving time and the sending time to determine a location of the mobile computing device.

22. The device-location system of claim 16, wherein, the distance from the at least one signal emitting device and the mobile computing device is determined from a calibration of at least one of the signal sending timestamp and the receiving timestamp comprises the server being adapted to, store calibration data; and adjust one of a sending time and a receiving time of the signal emitted from the at least one signal emitting device to one of a sending time and a receiving time for one or more of one or more devices and one or more networks.

* * * * *